United States Patent [19]

Holland-Moritz et al.

[11] Patent Number: 4,725,705

[45] Date of Patent: Feb. 16, 1988

[54] METHOD AND APPARATUS FOR ELECTRIC DISCHARGE MACHINING WITH ADAPTIVE FEEDBACK FOR DIMENSIONAL CONTROL

[75] Inventors: David K. Holland-Moritz, Ann Arbor; Thomas M. Kennedy, Chelsea; Gary F. Rupert, Ann Arbor, all of Mich.

[73] Assignee: Ex-Cell-O Corporation, Troy, Mich.

[21] Appl. No.: 781,115

[22] Filed: Sep. 27, 1985

[51] Int. Cl.⁴ .................................................. B23H 1/02
[52] U.S. Cl. ................................. 219/69 M; 219/69 R; 364/475
[58] Field of Search ........................... 73/37, 37.5, 37.8; 219/69 M, 69 R; 901/44, 45; 364/474, 475; 204/224 M

[56] References Cited

U.S. PATENT DOCUMENTS 4,626,645 12/1986 Inoue et al. ...................... 219/69 M Primary Examiner—Philip H. Leung
Assistant Examiner—Geoffrey S. Evans
Attorney, Agent, or Firm—Reising, Ethington, Barnard, Perry & Milton

[57] ABSTRACT

Electric discharge machining of workpieces on a mass production basis is accomplished with adaptive feedback control to achieve accurate machining of a feature to a specified size. After machining a feature, it is measured to obtain a value which represents its size. An EDM process parameter is adjusted in accordance with the measurement value so that the next feature will be machined with the size closer to the specified size. Multiple features are machined in succession and the measurement values of successive features are analyzed to determine the trend of change of the values with respect to the specified size. The parameter, such as spark energy, is adjusted in a sense which tends to cause the succeeding features to machined more accurately to the specified size.

29 Claims, 10 Drawing Figures

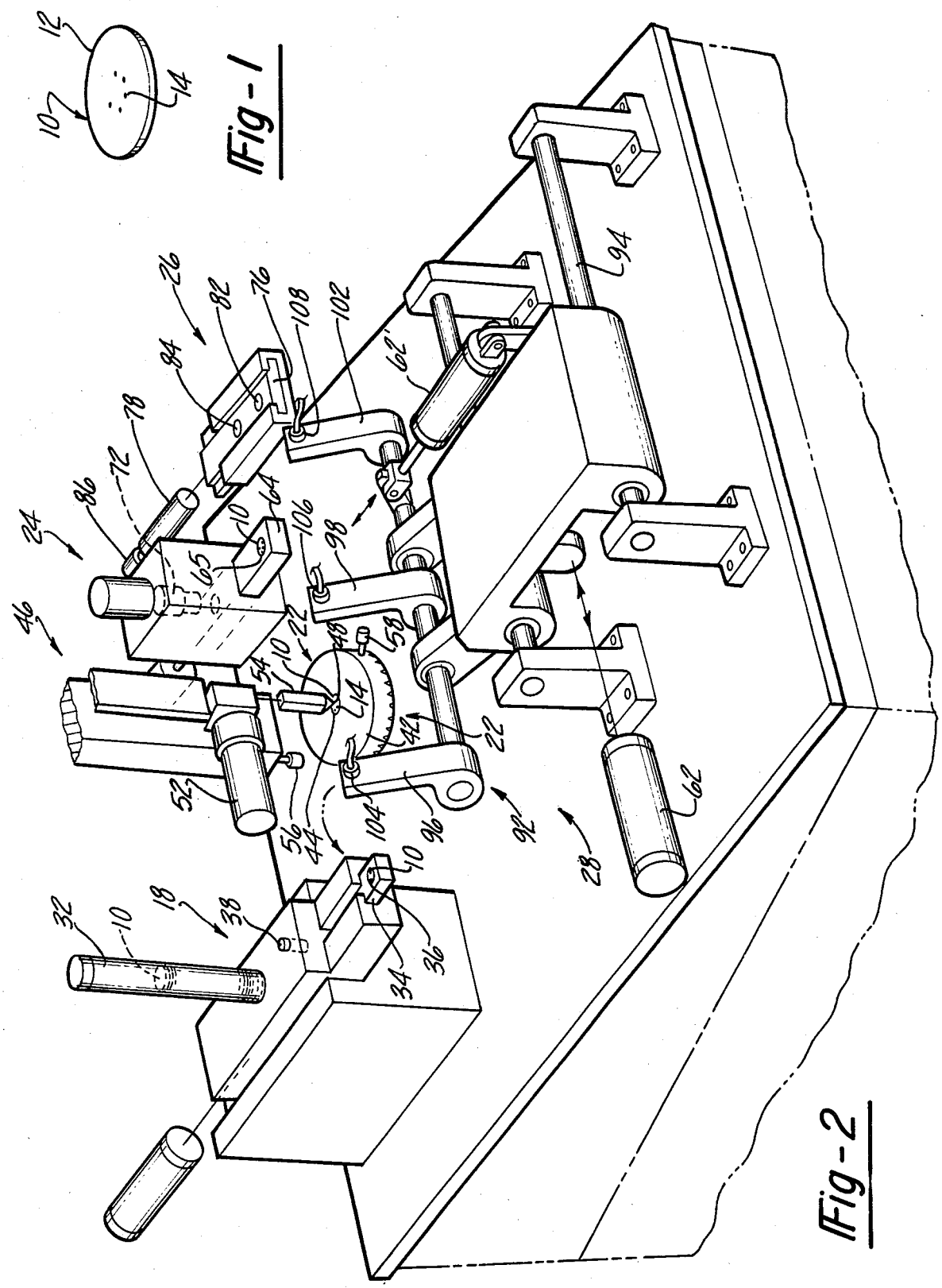

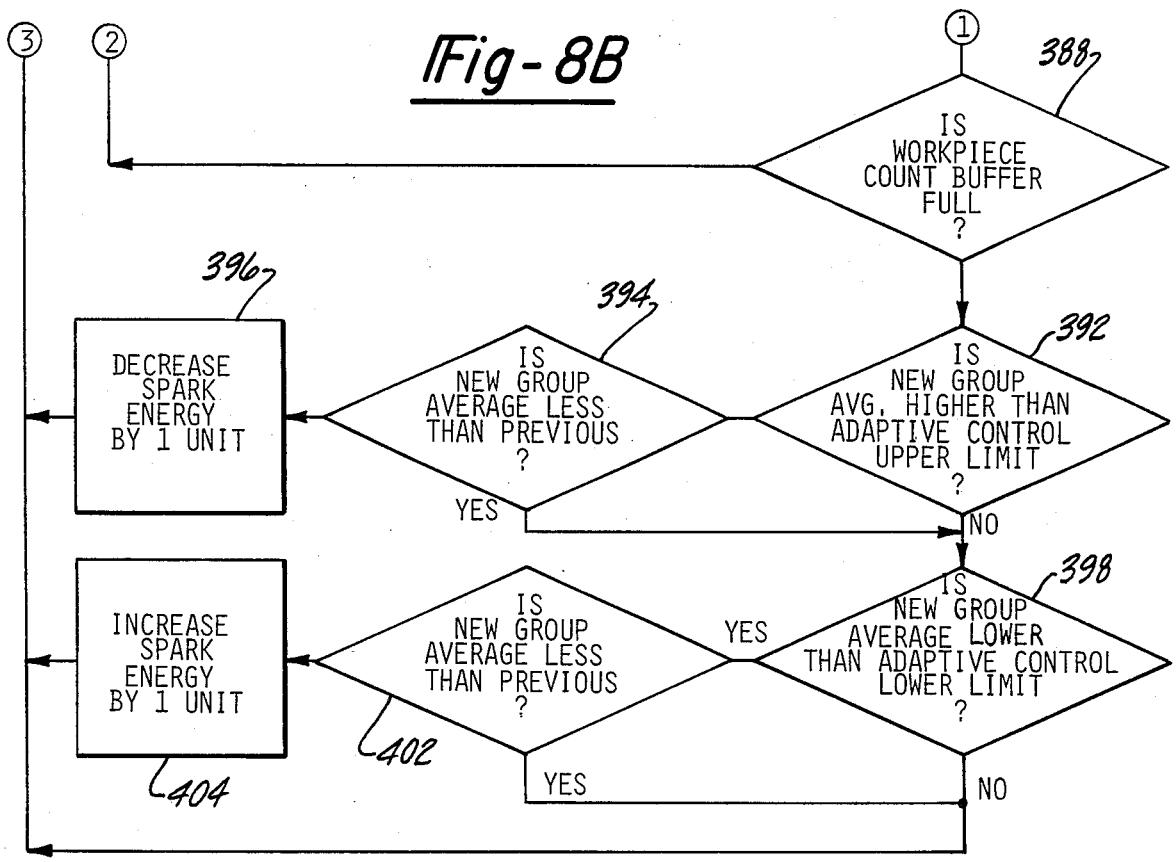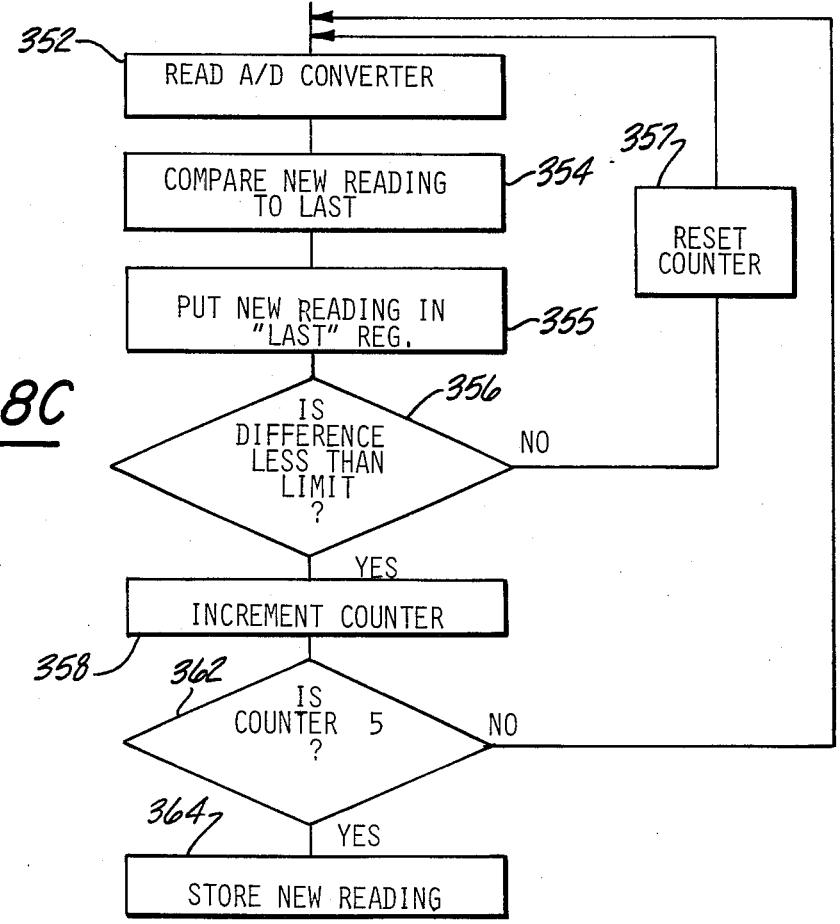

ured to obtain a measurement value which represents the size thereof. The measurement values of successive workpieces are analyzed to determine the trend of change of the measurement values with respect to the specified size, and a parameter which influences the effectiveness of the electrical discharge is adjusted in a sense which tends to cause the succeeding workpieces to be machined so that the size of the feature is within predetermined tolerances.

METHOD AND APPARATUS FOR ELECTRIC DISCHARGE MACHINING WITH ADAPTIVE FEEDBACK FOR DIMENSIONAL CONTROL

FIELD OF THE INVENTION

This invention relates to electric discharge machines (EDM); more particularly, it relates to method and apparatus for machining multiple parts or workpieces with substantially uniform accuracy.

BACKGROUND OF THE INVENTION

In many applications, electric discharge machining is used for the mass production of parts which must be machined to close tolerances. There are several factors which affect the repeatability of accuracy of machining by the EDM process including the process parameters of electrode size, spark energy, spark current, gap length and gap voltage. For example, when the EDM process is used to machine a small hole through a thin plate, the variation in diameter of the wire electrode over a large number of parts may result in many parts being out of tolerance unless special measures are taken. Also, mechanical wear in the fixturing system will result in variation in hole diameters. Even though such variations may be on the order of one ten thousandth inch, they nevertheless adversely affect the accuracy of the finished part. In the case of an orifice plate for fuel injectors, for example, the specified tolerance on the hole size is one percent but the electrode wire commercially available has a tolerance of two percent. Thus, the desired accuracy cannot be achieved uniformly by conventional practice.

Accordingly, there is a need for obtaining improved uniformity and accuracy by the EDM process. Further, it should be achieved without depending upon stringent control of the various parameters to precisely constant values. Instead, as a practical matter, the improved accuracy must be achieved while tolerating variations with time in certain operating parameters of the EDM process.

A general object of this invention is to provide an improved method and apparatus for electric discharge machining to obtain a high degree of accuracy and repeatable accuracy in the machining of parts.

SUMMARY OF THE INVENTION

In accordance with this invention, method and apparatus are provided for electric discharge machining of workpieces on a mass production basis with much greater accuracy than that achieved heretofore. This is accomplished by providing feedback control of at least one of the EDM process parameters whereby the variability of parameters outside of the process control is compensated so that uniformity of workpiece dimensions or size is achieved.

Further, according to the invention, a feature of a workpiece is machined to accurate size by an adaptive feedback control of an EDM process parameter. This is accomplished by machining the feature in a workpiece and measuring it to obtain a measurement value which represents the size of the feature. The process parameter is adjusted in accordance with the measurement value so that the next feature will be machined with a size closer to the specified size.

Further, according to the invention, method and apparatus are provided for electric discharge machining of workpieces to provide a feature thereof with a specified size within predetermined tolerances. Multiple workpieces are machined in succession to form each workpiece and the feature of successive workpieces is measured to obtain a measurement value which represents the size thereof. The measurement values of successive workpieces are analyzed to determine the trend of change of the measurement values with respect to the specified size, and a parameter which influences the effectiveness of the electrical discharge is adjusted in a sense which tends to cause the succeeding workpieces to be machined so that the size of the feature is within predetermined tolerances.

Further, in accordance with the invention, in the analysis, an average of the measurement values is computed for successive groups of workpieces and the trend of change from group-to-group is determined. If the deviation of the average measurement value exceeds a predetermined limit, a selected parameter is adjusted to reverse the trend. Preferably, the adjustable parameter is spark energy.

Further, in accordance with the invention, the workpiece feature is measured by comparison with a reference feature or gauge. For a feature such as a hole in the workpiece, the fluid flow capacity of the hole is compared with the fluid flow capacity of a reference hole and the difference therebetween is used as the measurement value. A workpiece is rejected when the measurement value exceeds an acceptability limit; further, the measurement value is eliminated from the computation of the average of the measurement values when it exceeds a certain transient limit which is greater than the acceptability limit. When the average of measurement values for the a group is higher than a control upper limit and not decreasing relative to the average of previous group, the spark energy is decreased by predetermined increment; when the average is lower than a control lower limit and not increasing, the spark energy is increased by a predetermined increment. Preferably, flow capacity is measured by measuring differential nozzle back pressure in a pneumatic bridge. Repeated measurements of back pressure are taken until a number of successive measurements are the same, within limits, and the last measurement is taken as the value of flow capacity. The reference hole and workpiece hole are alternately connected in the bridge to obtain successive measurements and the difference therebetween is taken as a measurement value for the workpiece hole.

A more complete understanding of this invention may be obtained from the detailed description that follows taken with the accompanying drawings.

DESCRIPTION OF THE DRAWINGS

FIG. 1 is a perspective view of an example workpiece;

FIG. 2 is a diagrammatic representation of an EDM machine embodying the subject invention;

FIGS. 8A, 8B and 8C are flow charts representing the method and operation of the subject invention.

BEST MODE FOR CARRYING OUT THE INVENTION

Figure 3:
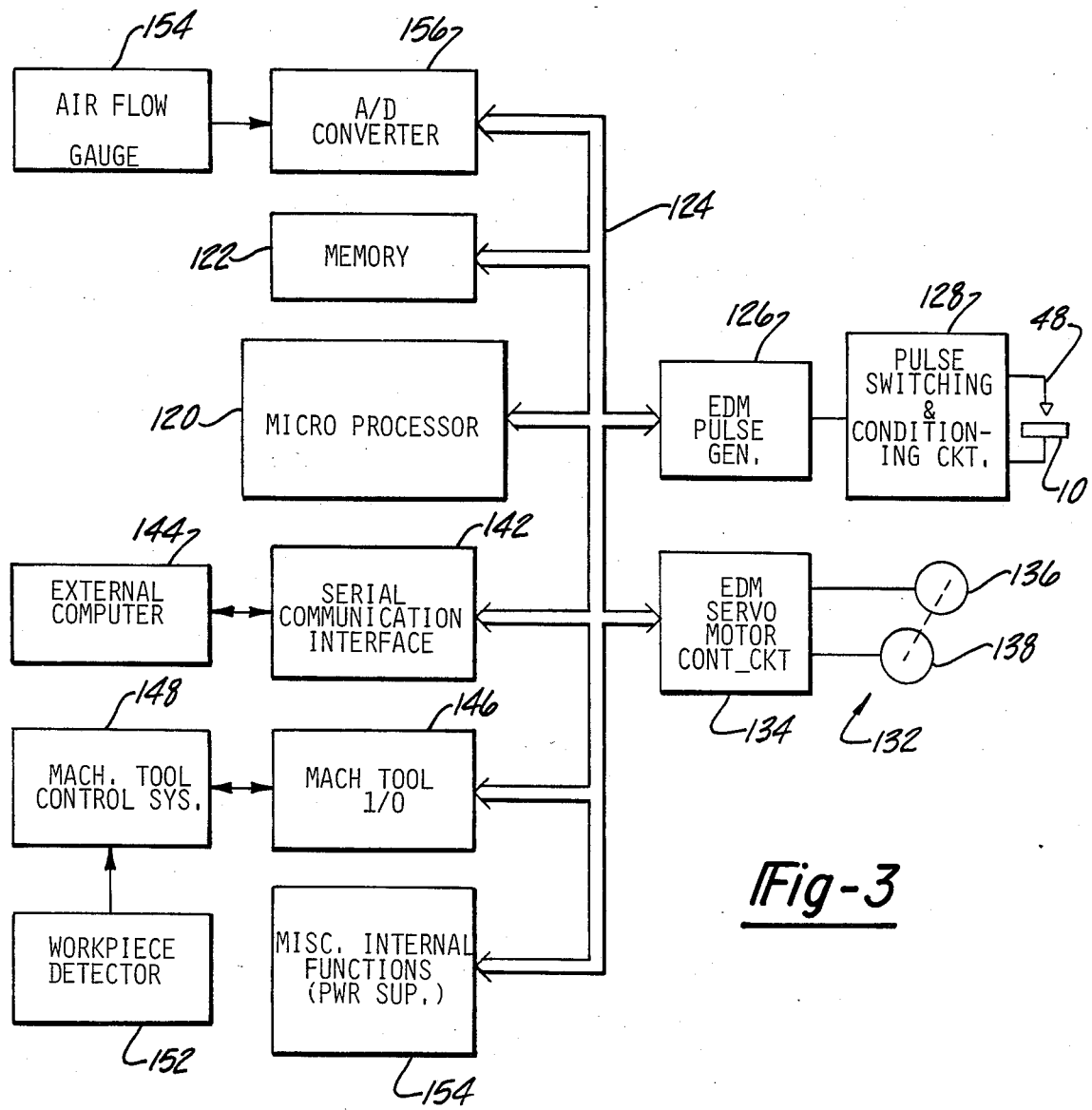
FIG. 3 is a block diagram of the electronic control system.

Referring now to the drawings, there is shown an illustrative embodiment of the invention in a method and an apparatus for electric discharge machining using an adaptive control system which adjusts a selected EDM parameter in response to a feedback signal representing workpiece measurement data. The adjustable EDM parameter is spark energy. A hole or set of holes is the workpiece feature to be machined to a specified size, as measured by its fluid flow capacity. It will be appreciated as the description proceeds that the invention may be embodied in many different forms and utilized for many different applications.

In the illustrative embodiment of the invention to be described, an electric discharge machining method and apparatus is utilized for machining a set of small holes in a thin plate. In particular, the example workpiece is an orifice plate for a fuel injection nozzle for use in an automotive engine. Such workpieces or parts must be manufactured in high volume using mass production techniques and must be held to very close dimensional tolerances. As shown in FIG. 1, the workpiece or part comprises a circular plate 10 with a set of six small holes 12 in a circular array surrounding the center of the plate 10. In the example workpiece, each of the holes has a specified diameter of six thousandths of an inch with a tolerance of plus or minus one ten thousandth of an inch. The set of holes of such size, taken collectively, has a certain fluid flow capacity. Measured flow capacity is used as an index of size.

The electric discharge machine embodying the invention is shown diagrammatically in FIG. 2. In general, it comprises a workpiece feed station 18, a machining sorting station 26. A workpiece transfer mechanism 28 is adapted to move each workpiece through the successive stations.

The workpiece feed station 18 comprises a workpiece magazine 32 which holds a large number of workpieces 10 in stacked relationship. A shuttle 34 is actuated by a pneumatic motor (not shown) and has a nest 36 thereon which receives an individual workpiece from the magazine 32. The shuttle 34 is reciprocated forwardly and rearwardly to position the nest alternately at the magazine 32 and at a transfer position in which it is shown in FIG. 2. A workpiece detector probe 38 in the form of an eddy-current probe is located adjacent the path of the nest 36 and produces an error signal if the workpiece is missing from the nest or is misoriented. The transfer mechanism 28 is adapted to transfer the workpiece from the feed station 18 to the machining station 22 in a manner which will be described subsequently.

The machining station 22 comprises a workpiece holder 42 which has a nest 44 thereon adapted to receive the workpiece 10. The holder 42 is mounted on an index table or turret (not shown) which is adapted to rotate the holder 42 to position the workpiece 10 in six different angular positions, one for each hole to be machined. The head of the electric discharge machine comprises a carriage 46 for feeding a wire electrode 48 for machining the holes in the workpiece at the work station on the holder 42. The wire electrode 48 passes through a refeed mechanism 52 and a wire guide 54 to the workpiece. The refeed mechanism 52 is adapted to advance the electrode wire, which is supplied from a spool (not shown), relative to the carriage 46 upon retraction of the carriage after each machining operation. After each machining operation to form one of the holes 14, the downward limit of the carriage 46 is sensed by a limit switch 56 which causes the holder 42 to be indexed to place the next hole location at the work station on the holder. When the holder 42 is indexed to the position for machining the last hole in the workpiece, a limit switch 58 enables the actuation of a transfer drive of the transfer mechanism 28. Upon completion of machining of the last hole in the workpiece the limit switch 56 causes energization of the drive 62 and the transfer mechanism 28 is actuated to transfer the workpiece 10 from the machining station 22 to the test station 24.

The test station 24 comprises a workpiece support member 64 having a nest 66 therein to receive the workpiece 10. An air gauge test head 72 is disposed opposite the support members 64 and is adapted to operatively engage the workpiece 10 to measure the air flow capacity thereof, in a manner that will be described subsequently. After the testing operation is complete, the workpiece 10 is transferred from the test station 24 to the sorting station 26.

The sorting station 26 comprises a sorting shuttle 76 which is reciprocated between forward and rearward positions by a drive cylinder 78. The shuttle 76 is provided with an accept funnel 82 at the forward end thereof and a reject funnel 84 at the rearward end. When the shuttle 76 is in its rearward or normal position, the accept funnel 82 is positioned to receive the workpiece transferred from the testing station 24. When the shuttle is in its forward position, the reject funnel is in a position to receive the workpiece transferred from the testing station 24. The linear motor 78 is controlled by a solenoid valve 86, the energization of which is controlled by a reject signal as will be described subsequently.

The transfer mechanism 28 includes a transfer rack 92 which is slidably mounted on a shaft 94 under control of the transfer drive 62. The transfer rack 92 comprises three arms 96, 98 and 102 and is rotatable about the shaft 94 by the transfer drive cylinders 62 and 62'. The arms 96, 98 and 102 are provided respectively with suction fittings 104, 106 and 108. The suction fittings are connected to a vacuum source (not shown) through a solenoid valve not shown) which is adapted to switchably apply atmospheric pressure or vacuum at the suction heads when the valve is energized and deenergized. When the transfer rack 92 is in its home position, as shown in FIG. 2, the suction head 104 is aligned with the nest 36 at the feeding station 18, the suction head 106 is aligned with the nest 44 at the machining station 22 and the suction head 108 is aligned with the nest 65 at the testing station 64. In this home position, the transfer rack 92 is in a rotative position such that the arms are positioned above the respective stations. The transfer rack remains in this position during the machining operations on the workpiece at the machining station 22. When the last machining operation is completed on a given workpiece, the transfer drive cylinder 62' actuates the rack 92 to rotate the arms 96, 98 and 102 downwardly so that the suction heads 104, 106 and 108 are positioned in close proximity to the respective nests 36, 44 and 65 with vacuum applied to the fittings. This draws the workpiece into the fittings on the respective arms and the transfer rack 92 is rotated upwardly by drive cylinder 62 and shifted laterally by drive cylinder 62 so that the arms 96, 98 and 102 are disposed opposite the machining station 22, testing station 24 and sorting station 26, respectively. Then, the transfer rack 92 is rotated downwardly to position suction fitting 104 over nest 44 and suction fitting 106 over nest 65 and to position suction fitting 108 over either the accept funnel 82 or the reject funnel 84 as the case may be depending upon actuation of the drive cylinder 78. In this position, the vacuum is released at the suction heads and the workpieces carried thereby are deposited with the respective stations. Then, the transfer rack 92 is returned to its home position in readiness the next transfer of the workpieces. This cycle is repeated for each successive workpiece so that each workpiece is moved from the feeding station 18 to the machining station 22 then to the testing station 24 and finally to the sorting station 26.

The electronic control system for the electric discharge machine described above is shown in block diagram in FIG. 3. The electric discharge machine operates under the control of a microprocessor 120 which is coupled with a memory 122 and with other components of the control system through a bus 124. The memory 122 includes a read-only memory (ROM) which stores the operating program for the EDM process including a program for adaptive control of the process as will be described subsequently. It also includes a random access memory (RAM) for use in the execution of the control program and for storage of data. The microprocessor 120 controls the EDM parameters necessary for machining of the workpiece according to the stored program. The system includes a pulse generator 126 controlled by the microprocessor 120 for supplying the required electrical pulses for the EDM process. The output of the pulse generator 126 is applied to a pulse switching and conditioning circuit 128 which supplies the power to the gap between the electrode 48 and the workpiece 10 for machining of the workpiece. A servo system 132 moves the carriage 46 for controled feed and retraction of the electrode 48 in the machining operation. The servo system 132 comprises and EDM servo motor control circuit 134 which operates under the control of the microprocessor 120 to control the energization of the servo motor 136 which is coupled with the carriage 46. A tachometer 138 coupled with the motor 136 develops a feedback voltage for the control circuit 134.

An input/output serial communication interface 142 is provided for connection of the microprocessor 120 with an external device 144 such as a computer or terminal. An input/output module 146 provides an interface with a machine tool control system 148. The machine tool control system comprises a programmable controller for controlling the machine functions including the part shuttle 34 and the transfer mechanism 92. The control system 148 receives an input from the workpiece detector 152. The operation of the control system 148 is correlated with the machining operation through the interface 146 with the microprocessor 120. The system also includes a control system 154 for internal machining functions including power supply, a display terminal and a keyboard input.

The measurement system comprises a fluid flow meter 154 which includes the test head 72. It is adapted to alternately test a machined workpiece and a gauge member for flow capacity. The flow gauge develops an analog signal corresponding to the measured flow capacity and the signal is applied to the input of an analog-to-digital converter 156. The digital flow capacity signals developed by the converter 156 are processed by the microprocessor 120 for developing adaptive control signals for the EDM process, as will be described subsequently.

Figure 4:
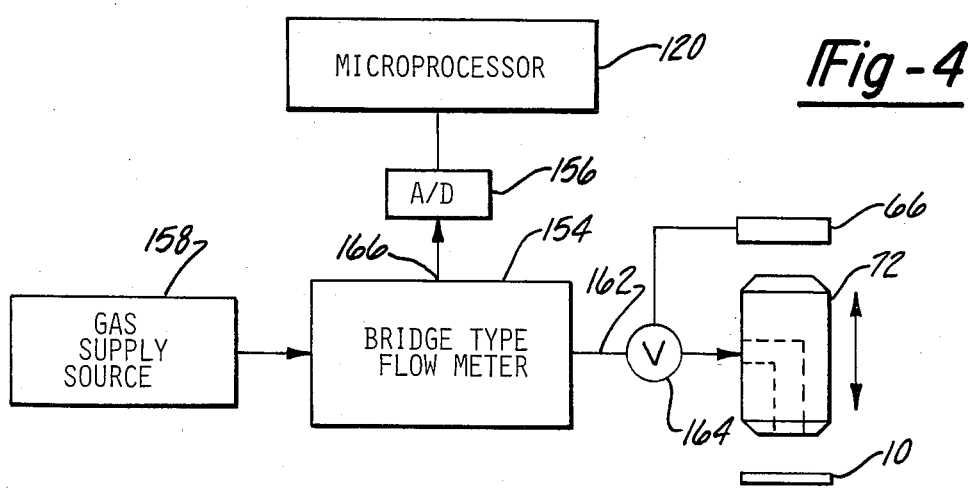
FIG. 4 is a diagram of a measurement system.

The fluid flow meter 154 will be described in greater detail with reference to FIGS. 4 and 5. As shown in FIG. 4, the flow meter 154 is supplied with a regulated air pressure input from a pressurized gas supply source 158. The flow meter 154 includes the test head 72 previously described with reference to FIG. 2. The test flow output 162 of the bridge is connected with a valve 164 which is adapted to switch the test flow to the test head 72 when it engages workpiece 10 or to the gauge member 66. The flow meter 154 produces an analog electrical signal proportional to the flow measurement at the signal output 166 which is coupled through the analog-to-digital converter 156 to the microprocessor 120.

Figure 5:
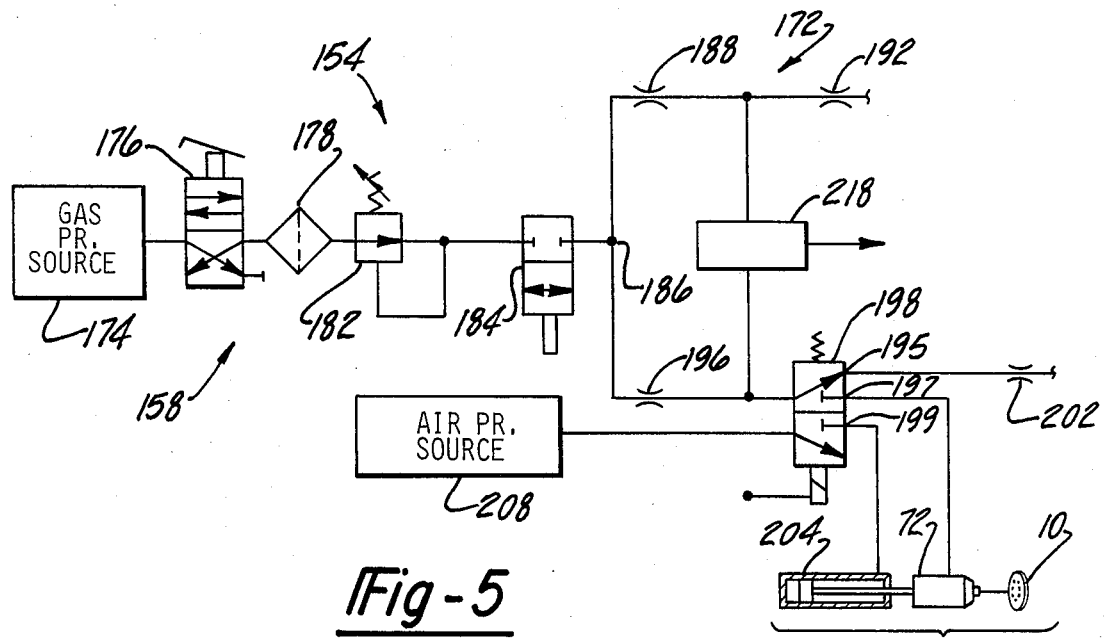
FIG. 5 is a schematic diagram of a pneumatic bridge.

The flow meter 154 is shown in schematic diagram in FIG. 5. In general, it comprises a bridge circuit 172 and the pressurized gas supply source 158. The supply source 158 comprises a gas pressure source 174, suitably pressurized nitrogen. The gas from the source 174 is supplied through a shut-off valve 176, a filter 178, a pressure regulator 182 and a solenoid valve 184 to the bridge inlet port 186. The bridge circuit 172 comprises a reference flow branch including an orifice 188 in a first arm and an orifice 192 in an adjoining arm. The orifices 188 and 192 are serially connected between the inlet port 186 and atmosphere. Bridge circuit 172 comprises a test branch including an orifice 196 in one arm; the adjoining arm includes a solenoid valve 198 having one valve inlet port connected with the orifice 196. One valve outlet port 195 is connected to a master orifice or gauge 202 which discharges to the atmosphere. Gauge 202 is selected to have a flow capacity equal to that specified for the workpiece. Another outlet port 197 of the solenoid valve 198 is connected with the test head 72 which is adapted to engage the workpiece 10 being tested. The workpiece 10 functions as a test orifice in the bridge circuit when it is operatively connected by the valve 198 in series with the orifice 196 to the inlet port 186. The test head 72 is actuated by pneumatic piston 204 to engage or disengage the workpiece 10 under the control of the solenoid valve 198. For this purpose, an inlet port 206 on the valve 198 is connected with an air pressure source 208. An outlet port 199 on the valve 198 is connected with the pneumatic cylinder 204. The solenoid valve is energized under the control of the microprocessor 120. When it is deenergized, the master orifice or gauge 202 is connected thereby into the bridge circuit; when it is energized, the pneumatic piston 204 actuates the test head 72 into engagement with the test part which is thereby connected in the bridge circuit.

The bridge circuit 172 also includes a differential pressure sensor 218 having one input connected to the junction of orifices 188 and 192 and having the other input connected to the junction of orifice 196 and the inlet port of the valve 198. The pressure sensor 218 is adapted to develop an analog electrical signal proportional to the difference in pressure at the two input ports of the sensor. The output of the sensor 218 is coupled to the input of the analog-to-digital converter 156. The orifice 188 and the orifice 196 are matched to each other, i.e. they have the same flow capacity. Similarly, the orifice 192 and the gauge 202 are matched to each other. Thus, when the gauge 202 is switched into the bridge circuit, the bridge is balanced and there is no differential pressure across the pressure sensor 218 and the output signal thereof is at its reference value. When the workpiece 10 under test is switched into the bridge circuit, the pressure drop thereacross is effectively compared with that across the orifice 192. The orifice 192 is selected to have a flow capacity which is equal to that of gauge 202. Thus, when the workpiece 10 has the specified flow capacity, the bridge is balanced and the output of the pressure sensor 218 is at its reference value. (In the illustrative embodiment the reference value is set, for example, at 2.5 volts.) If the workpiece 10 being tested has a flow capacity different from that of orifice 192, the bridge will be unbalanced and the differential pressure signal from the sensor 218 will have a value greater or lesser than the reference value in accordance with the difference in flow capacities.

In the measurement process, the differential pressure signal for the workpiece represents the difference in flow capacity of the workpiece from that of the orifice 192. Similarly, the differential pressure signal for the gauge member 202 represents the difference in flow capacity for the gauge member from that of the orifice 192. A special procedure, which will be described subsequently, is utilized to ensure that the differential pressure signal accurately represents the difference in flow capacity. A measurement of the gauge member is made immediately after the measurement of each workpiece, with a minimum of time delay, to ensure that drift in the measurement system will not result in an erroneous measurement of the workpiece. It will be understood that the gauge member may be measured first followed immediately by measurement of the workpiece or vice versa.

The differential pressure signals from the flow meter 166 are converted to digital signals by the analog-to-digital converter 156. In order to obtain differential pressure signals which accurately represent the flow capacity, the back pressures in the bridge 172 at the sensor 218 must be allowed to reach the stable state. However, to minimize the time required, the differential pressure signal should be used just as soon as it reaches a stable state. For this purpose, microprocessor 120 takes periodic readings of the differential pressure signal and compares each successive reading with the previous readings to signify the stability of the back pressure. (In the illustrative embodiment the periodic readings are taken at the rate of about one per second.) When selected number of successive readings, five for example, are substantially equal to each other, i.e. within a specified tolerance, that reading is taken as the differential pressure signal for the workpiece under test or the gauge member, as the case may be.

Before proceeding further with description of the electronic measurement system, it will be helpful to consider the method of obtaining the workpiece measurement value and its use in the adaptive control system. The differential pressure signal for the workpiece under test is compared with the differential pressure signal of the gauge. The algebraic difference between these two signals is taken as the relative flow value for the workpiece. Comparing the workpiece flow value with the reference flow value of the gauge, rather than taking an absolute flow value, minimizes the effects of drift in the flow measurement system. When the relative flow value of the workpiece is within a specified transient limit, the value is stored; if not, it is not stored and the workpiece is rejected as being out of limits. The transient limit is established to eliminate from the process occasional workpieces that are so far out of tolerance that they do not represent useful data for correction of the process. For example, such a workpiece may result from various transient conditions such as a misloaded blank, a defective blank or an obstruction in an orifice. For maintaining stability in control process it is desirable to omit data on such workpieces from the feedback loop. If the relative flow value is within the transient limit but not within the workpiece acceptance limits (tolerances), the value is stored for additional processing but the workpiece is rejected as being out of tolerance.

In order to control the EDM process to achieve the desired workpiece hole size, feedback information is developed in the form of relative flow value, as a measure of hole size. In the EDM process, adaptive control is achieved by utilizing the relative flow value to signify the need for adjustment of an EDM process parameter which affects hole size. In the illustrative embodiment, the EDM spark energy is utilized as the adjustable parameter for controlling hole size in accordance with feedback information. There are many factors that influence hole size in the EDM process, some of which cannot be controlled in the EDM process, such as electrode dimensions and part dimensions. These factors add a random variation to the feedback signal. In order to stabilize the process, the random variation must be stabilized or the individual random variations must be ignored. In the illustrative embodiment, the individual random variations are ignored by taking an average of the relative flow values for a group of "n" workpieces in succession. By comparing successive group averages, feedback information indicative of the trend of change is obtained. If too many workpieces are included in a group, the adaptive response becomes sluggish and many workpieces would be rejected that could have been saved if a smaller group size were used. The optimum sample size for averaging must be established for different types of workpieces. In the illustrative embodiment, the optimum sample size is five workpieces per group.

In order to develop a feedback signal for adaptive control of the EDM process, upper and lower adaptive control limits are established for the relative flow value of the workpiece. If the average of the relative flow value for the last group is below the upper adaptive control limit and above the lower adaptive control limit, no correction of the process is called for and the adjustable parameter, i.e. spark energy, is not changed. On the other hand, if the average is above the upper adaptive control limit or below the lower adaptive control limit, need for a change of spark energy is indicated. Preferably, another criteria is utilized for making a decision whether to adjust the spark energy. This additional criteria is the value of the average for the last group relative to the average for the next to last group. In particular, if the average from the last group is higher than the upper adaptive control limit and is not less than the average for the next to last group, the spark energy is decreased. If, on the other hand, the average for the last group is less than the adaptive control lower limit and is not greater than the average for the next to last group, the spark energy is increased. When a change in spark energy is called for, the change is made in discrete increments, one increment at a time, as will be described presently.

Figure 7:
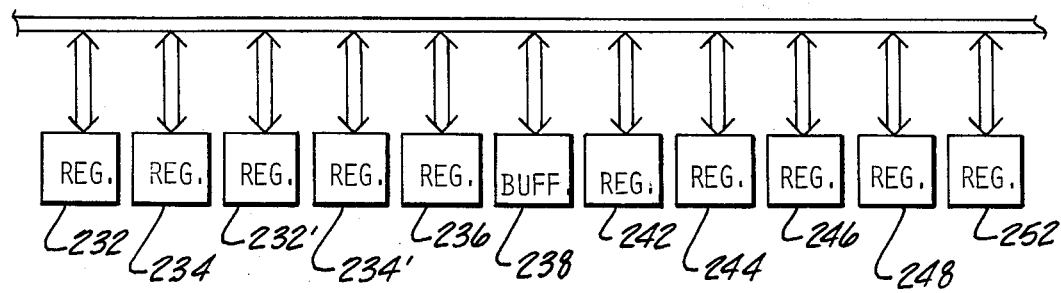
FIG. 7 represents a part of a memory system.

In order to implement the measurement and adaptive control just described, the RAM section of memory 122 of the microprocessor 120 is provided with a set of registers and buffers. As shown in FIG. 7, the memory 122 includes a workpiece pressure signal register 232 to store the last differential pressure signals of the workpiece measurement. Similarly, a gauge differential pressure register 234 stores the last differential pressure signals of the gauge. When the signals in the registers 232 have stabilized, the final signal is stored in the workpiece signal register 232'. Similarly, when the gauge signals have stabilized, the final signal is stored in the gauge signal register 234'. A transient limit register 236 stores a predetermined relative flow value to establish a transient limit. A workpiece acceptance limits register 246 stores the relative flow values which represents the upper and lower tolerances for the workpiece. The workpiece count buffer 238 stores the relative flow values for the last "n" workpieces which represents the last group. (In the illustrative embodiment, "n" is equal to five.) The last group register 242 stores the average value of the last group. The next to last group register 244 stores the average value of the next to last group. Registers 248 and 252 store the adaptive control upper limit and lower limit, respectively.

Figure 6:
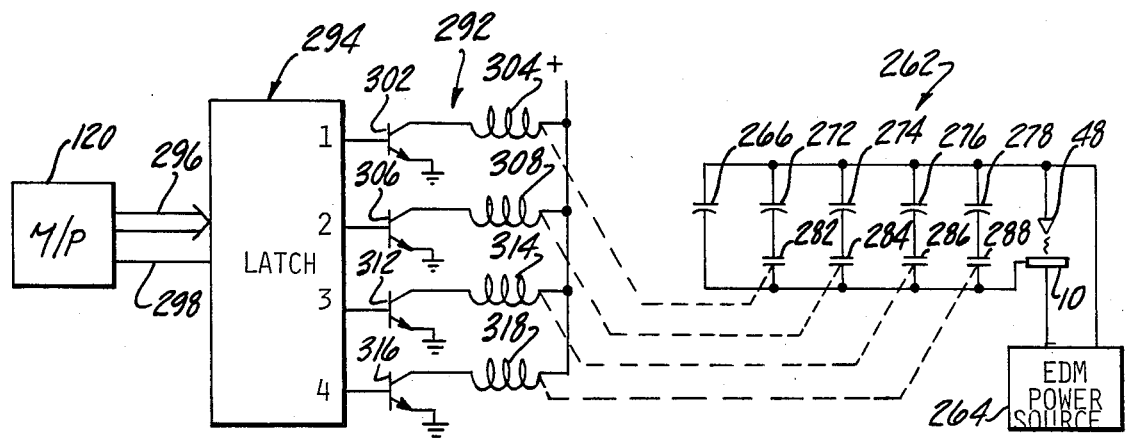
FIG. 6 is a diagram of an energy control system for the EDM machine.

In the adaptive control of the EDM process, the spark energy is adjusted under the control of the microprocessor 120 by the circuit shown in FIG. 6. A capacitor type power supply 262 is connected across the electrode 48 and the workpiece 10. The power supply comprises a power source 264 and a main storage capacitor 266 connected across the power source and the EDM gap between the electrode 48 and the workpiece 10. It also comprises a set or bank of auxiliary storage capacitors 272, 274, 276 and 278. Each of these capacitors is connected in parallel with the main storage capacitor 266 through respective switch contacts 282, 284, 286 and 288. The auxiliary storage capacitors are of different capacitance values so that a range of capacitance variation can be obtained with equal increments of change by successive switching. When an auxiliary storage capacitor is switched into parallel connection with the main storage capacitor the total capacitance is increased by a selected increment of capacitance. The spark energy at the EDM gap increases with capacitance; accordingly, the spark energy which is realized can be increased by the selective switching of the auxiliary storage capacitors 272, 274, 276 and 278 into and out of parallel connection with capacitor 266. The values of capacitors 272, 274, 276 and 278 are weighted in a binary fashion, i.e. their values are related by factors of 1, 2, 4 and 8, respectively, and the main capacitor 266 has a reference or offset value which establishes the minimum value of storage capacitance. This provides for a trial capacitance ranging from a maximum value equal to the sum of all of the capacitors with incremental change equal to the value of the smallest capacitor. For this purpose, the auxiliary storage capacitors are switched by a relay circuit 292 which is controlled by a latch 294 which in turn is controlled by the microprocessor 120. The latch 294 is connected with the microprocessor through a bus 296 and a strobe line 298. Output 1 of the latch 294 is connected to a switching transistor 302 which has its output connected with a control relay 304. Similarly, output 2 is connected through switching transistor 306 with a control relay 308; output 3 is connected through a switching transistor 312 with a control relay 314 and output 4 is connected through a switching transistor 316 with a control relay 318. The control relays 304, 308, 314 and 318 are operatively connected with the switch contacts 282, 284, 286 and 288, respectively, for actuation thereof. When output one of the latch 294 is at logic low, the transistor 302 is turned off and the relay 304 is deenergized. In this condition, the switching contacts 282 are opened and the auxiliary storage capacitor 272 is effectively disconnected from the power supply circuit. When output one goes high, the switching transistor 302 energizes relay 304 which closes switching contacts 282 and connects the auxiliary storage capacitor 272 in parallel connection with main storage capacitor 266. The remaining auxiliary storage capacitors are operated in the same manner by the respective outputs of the latch 294.

As described above, the microprocessor 120 is connected with the memory 122 which includes a read-only memory (ROM) which stores the operating program for the electric discharge machine. The operating program is represented by the flow charts of FIGS. 8A, 8B and 8C which will be described subsequently. The memory 122 also includes a read/write memory, i.e. a random access memory (RAM) which is utilized for various registers and buffers as will be described subsequently.

Figure 8A:
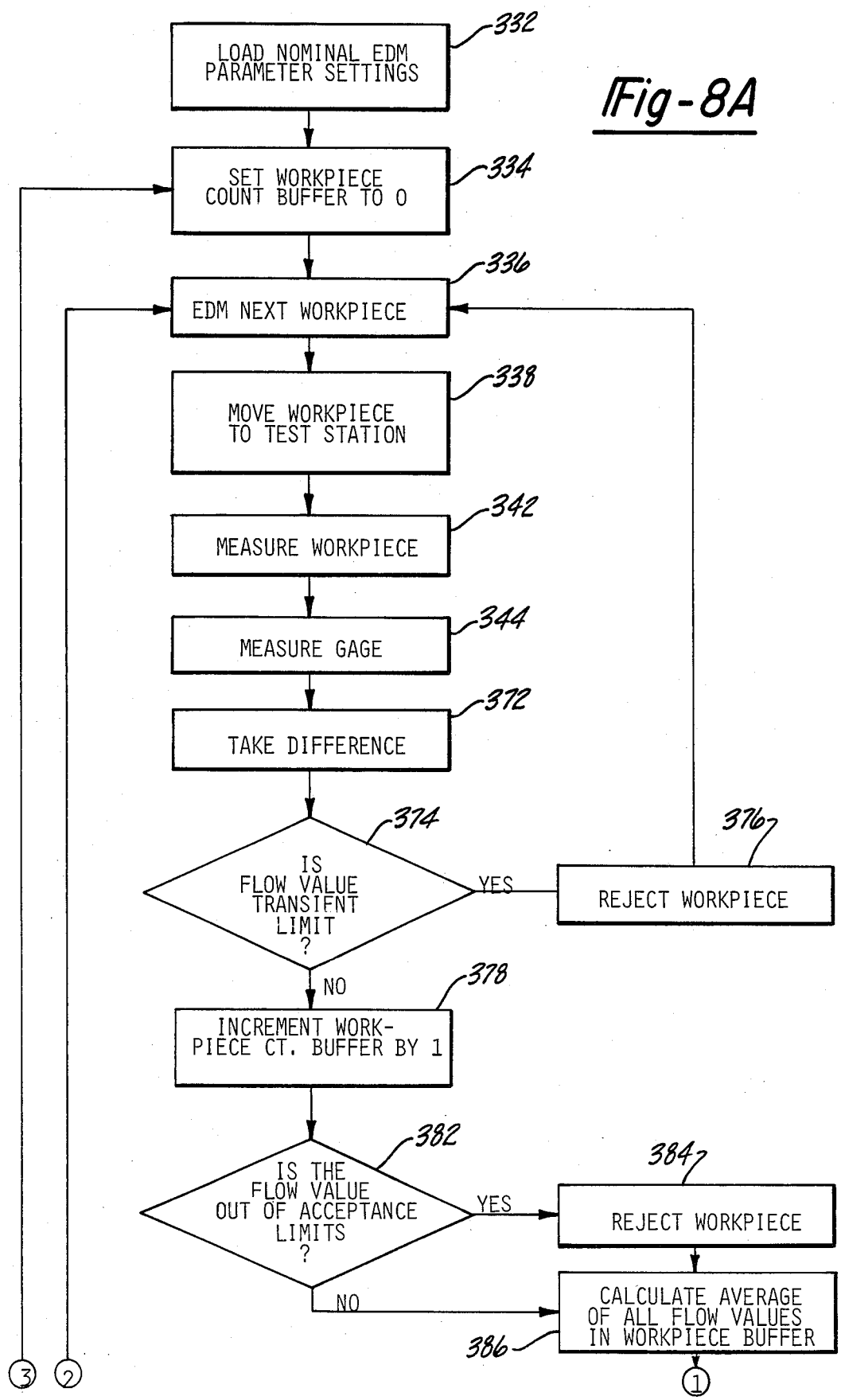

The operation of the electric discharge machine will now be described with reference to the flow charts as shown in FIGS. 8A, 8B and 8C. As an initialization step, the memory 122 is loaded with certain EDM parameter settings as represented by block 332. This includes loading the transient limit in register 236, the workpiece acceptance limits in register 246 and the adaptive control limits in registers 248 and 252. Next, the program advances to block 334 which sets the workpiece count buffer 238 to zero. At block 336 the next workpiece is machined and the program advances to block 338 which causes the workpiece to be moved from the EDM station to the test station. In the test station, as represented by block 342, the workpiece is measured to obtain a differential pressure signal for the workpiece. Then, the program advances to block 344 which measures the gauge to obtain a differential pressure signal for the gauge. The measurement process of both blocks 342 and 244 is carried out under program control as represented by the subroutine of FIG. 8C, which will be described presently.

The measurement subroutine of FIG. 8C, as mentioned above, is executed for measuring the workpiece and also for measuring the gauge. In this subroutine, block 352 reads the analog-to-digital converter 156 to obtain the new or current differential pressure signal. This new reading of the converter is compared to the last reading of the converter by block 354. At block 355 the new reading is put in the workpiece differential signal register 232 (the "last" register). Test block 356 determines whether the difference between the new reading and last reading is less than the preset limit. If it is not, the subroutine loops back to block 357 which resets a counter for the number signals which differ from the last reading by less than the preset limit. Then the program returns to block 352. If the difference between the new reading and the last is less than the limit, the program advances to block 358 which increments the counter. Then test block 362 determines whether the counter is equal to five. If it is not, the program loops back to block 352 for another reading. If the counter is equal to five then five successive readings have been obtained which are within the preset limit and the new reading is stored by block 364 in the appropriate register. If the reading is that of the workpiece, it is stored in register 232'; if it is the gauge reading it is stored in register 234'.

Reverting now to the flow chart of FIG. 8A, the program proceeds to block 372, after measurement of the workpiece by block 342 and measurement of the gauge by block 344. Block 372 takes the algebraic difference of the measurement of the workpiece in register 232' and the measurement of the gauge in register 234'. This quantity represents the relative flow value of the workpiece. Then, the program advances to test block 374 which determines whether the flow value of the workpiece is outside of the transient limit value in register 236. If it is, the workpiece is rejected at block 376 and the program loops back to 336 to EDM the next workpiece. If it is not, the program advances to block 378 which increments by one the workpiece count buffer 238. Next, test block 382 determines whether the flow value is outside of the acceptance limits which are set in register 246. If it is, the workpiece is rejected at block 384 then the program advances to block 386. If it is not outside the acceptance limits, the program goes directly to block 386 which calculates the average of all flow values in the workpiece count buffer 238. Then the program advances to test block 388 which determines whether the workpiece count buffer 238 is full. If it is not, the program loops back to block 336 to machine the next workpiece. If it is full, the last workpiece of the new group has been processed and the average flow value determined by block 386 is stored in the new group average register 242. Then the program advances to test block 392 which determines whether the new group average in register 242 is higher than the adaptive control upper limit stored in register 248. If it is, the program advances to test block 394 which determines whether the new group average is less than the previous group average which is stored in register 244. If it is not, the program proceeds to block 396 which decreases the spark energy by one unit by operation of the latch 294 and the relay circuit 292. Then, the program loops back to block 334 which sets the workpiece count buffer 238 to zero and to machine the first workpiece of the next group. If at test block 392 the answer is no, the program advances directly to test block 398. If the answer at test block 392 is yes, and the answer at test block 394 is also yes, the program advances to test block 398. Test block 398 determines whether the new group average flow value in register 242 is lower than the adaptive control lower limit which is preset in register 252. If it is, the program advances to test block 402 which determines whether the new group average is smaller than the previous group average. If it is not, block 404 increases the spark energy by one unit. Then, the program loops back to block 334 which sets the workpiece count buffer 238 to zero and the first workpiece of the next group is machined. If the answer to test block 402 is yes or if the answer to test block 398 is no, the program loops back to block 334 to set the workpiece count buffer to zero and machine the first workpiece of the next group.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. The method of electric discharge machining a workpiece to provide a feature thereof with a specified size within predetermined tolerances, said machining being of the type wherein the workpiece is eroded by an intermittent electrical discharge across the gap between an electrode and the workpiece, the effectiveness of said intermittent electrical discharge in eroding said workpiece being determined by plural parameters at least one of which is adjustable, said method comprising the steps of:

machining multiple workpieces in succession to form each workpiece with said feature, said feature having a size which varies with the effectiveness of said electrical discharge, measuring said feature of successive workpieces to obtain a measurement value which represents the size of said feature, analyzing said measurement values of successive workpieces to determine the trend of change of said measurement values with respect to said specified size, and adjusting an adjustable parameter in a sense which tends to cause succeeding workpieces to be machined so that the size of said feature is within said predetermined tolerances.

2. The invention as defined in claim 1 wherein said step of analyzing includes computing for successive groups of workpieces an average of said measurement values within each group and determining said trend of change among successive groups in the order in which the groups were machined.

3. The invention as defined in claim 2 wherein said electrode is a wire electrode and said feature is a workpiece hole in said workpiece.

4. The invention as defined in claim 1 wherein said adjustable parameter is spark energy.

5. The invention as defined in claim 2 including the step of eliminating from said computation individual measurement values which are not within predetermined limits.

6. The invention as defined in claim 1 wherein said measuring includes comparison with a reference feature.

7. The invention as defined in claim 3 wherein said measuring comprises comparing the fluid flow capacity of said workpiece hole with the fluid flow capacity of a reference hole and using the difference therebetween as said measurement value.

8. The invention as defined in claim 7 including the step of rejecting a workpiece when the measurement value thereof exceeds an acceptability limit and eliminating from said computing of said average of said measurement values thereof when it exceeds a transient limit which is greater than said acceptability limit.

9. The invention as defined in claim 7 including decreasing the spark energy by a predetermined increment if the average is higher than a control upper limit and not decreasing and increasing the spark energy by a predetermined increment if the average is lower than a control lower limit and not increasing.

10. The invention as defined in claim 7 wherein said measuring comprises measuring differential pressure in a pneumatic bridge.

11. The invention as defined in claim 8 wherein said measuring differential pressure includes making repeated measurements thereof until a predetermined number of successive measurements are the same within predetermined limits and taking the last measurement as the value of fluid flow capacity.

12. The invention as defined in claim 7 wherein said measuring comprises connecting said reference hole and said workpiece hole alternately in said pneumatic bridge to obtain successive measurements of differential pressure and taking the difference between said measurements as the measurement value for said workpiece hole.

13. Apparatus for electric discharge machining to provide a feature with a specified size in a workpiece comprising:
   an electric discharge machine of the type including a power supply and an electrode adapted to be connected in circuit with the workpiece to erode the workpiece by an intermittent electrical discharge across the gap between the electrode and the workpiece, the effectiveness of said intermittent discharge in eroding said workpiece being determined by plural parameters at least one of which is adjustable,
   means for controlling said electric discharge machine for successively machining a multiplicity of said features each having a size which varies with the effectiveness of said electrical discharge,
   means for measuring successive feature to obtain a measurement value which represents the size of each feature,
   means for analyzing the measurement values of successive features to determine the trend of change of the measurement values with respect to said specified size,
   and means for adjusting an adjustable parameter in a sense which tends to cause succeeding features to be machined to said specified size.

14. The invention as defined in claim 13 wherein said means for analyzing includes means for computing for successive groups of features an average of said measurement values within each group and determining the trend of change among successive groups in the order in which the groups were machined.

15. The invention as defined in claim 13 wherein said electrode is a wire electrode and said feature is a hole in the workpiece.

16. The invention as defined in claim 13 wherein said adjustable parameter is spark energy.

17. The invention as defined in claim 14 including means for eliminating from said computation individual measurement values which are not within predetermined limits.

18. The invention as defined in claim 13 wherein said means for measuring includes means for comparing said feature with a reference feature.

19. The invention as defined in claim 15 wherein said means for measuring comprises means for comparing the fluid flow capacity of said hole with the fluid flow capacity of a reference hole and using the difference therebetween as said measurement value.

20. The invention as defined in claim 19 including means for rejecting a workpiece when the measurement value thereof exceeds an acceptability limit and for eliminating from said computation the measurement value thereof when it exceeds a transient limit which is greater than said acceptability limit.

21. The invention as defined in claim 19 wherein said means for adjusting includes means for decreasing the spark energy by a predetermined increment if the average is higher than a control upper limit and not decreasing and for increasing the spark energy by a predetermined increment if the average is lower than a control lower limit and not increasing.

22. The invention as defined in claim 19 wherein said means for measuring comprises a pneumatic bridge for measuring differential pressure.

23. The invention as defined in claim 20 wherein said means for measuring includes means for making repeated measurements until a predetermined number of successive measurements are the same within predetermined limits and taking the last measurement as the value of fluid flow capacity.

24. The invention as defined in claim 22 wherein said means for measuring comprises means for connecting said reference hole and said workpiece hole alternatively in said pneumatic bridge to obtain successive measurements of differential pressure and taking the difference between said measurements as the measurement value for said workpiece hole.

25. The method of electric discharge machining a workpiece to provide a feature thereof with a specified size within predetermined tolerances, said machining being of the type wherein the workpiece is eroded by an electrode discharge across the gap between an electrode and the workpiece, the effectiveness of said electrical discharge in eroding said workpiece being determined by plural parameters of which a first parameter is varaible during machining of said workpiece and a second parameter is adjustable, said method comprising the steps of:
   machining a workpiece with a feature having a size which varies with the effectiveness of said electrical discharge, allowing said first parameter to vary during said machining and maintaining said second parameter at an adjusted value during said machining,
   measuring said feature to obtain a measurement value which represents the size of said feature,
   adjusting said second parameter in accordance with the deviation of said measurement value from said specified size,
   and machining another workpiece to provide said feature while allowing said first parameter to vary and maintaining said second parameter at the last adjusted value.

26. The invention as defined in claim 25 including the steps of:
   machining multiple workpieces in succession to form each workpiece with said feature,
   and analyzing the measurement values of successive workpieces to determine the trend of change of said measurement values with respect to said specified size.

27. The invention as defined in claim 26 wherein said step of analyzing includes computing for successive groups of workpieces an average of said measurement values within each group and determining said trend of change among successive groups in the order in which the groups were machined.

28. The invention as defined in claim 27 wherein said electrode is a wire electrode and said feature is a workpiece hole in said workpiece.

29. The invention as defined in claim 28 wherein said first parameter is electrode diameter and said second parameter is spark energy.

* * * * *

UNITED STATES PATENT AND TRADEMARK OFFICE
CERTIFICATE OF CORRECTION

PATENT NO. : 4,725,705  Page 1 of 2
DATED : February 16, 1988
INVENTOR(S) : Holland-Moritz et al It is certified that error appears in the above-identified patent and that said Letters Patent is hereby corrected as shown below: On The Title Page:

IN THE ABSTRACT:

Line 14, after "features to" insert -- be --.

IN THE SPECIFICATION:

Column 2, line 33, delete "of" and insert -- for the --.

Column 3, line 36, after "ing" insert -- station 22, a test station 24 and a workpiece --.

Column 4, line 8, after "drive" insert -- 62 --.

Line 45, after "valve" insert -- ( --.

Line 64, delete "workpiece" and insert -- workpieces --.

Column 5, line 37, deleted "controled" and insert -- controlled --.

Column 9, line 52, delete "trial" and insert -- total --.

UNITED STATES PATENT AND TRADEMARK OFFICE
CERTIFICATE OF CORRECTION

PATENT NO. : 4,725,705

DATED : February 16, 1988

INVENTOR(S) : Holland-Moritz et al.

It is certified that error appears in the above-identified patent and that said Letters Patent is hereby corrected as shown below:

Column 9, line 52, after "a" insert --minimum value equal to that of capacitor 266 to a --.

Signed and Sealed this

First Day of November, 1988

Attest:

DONALD J. QUIGG

Attesting Officer

Commissioner of Patents and Trademarks